Feb. 9, 1954 W. M. HOUSTON 2,668,617
PRODUCTION OF PHOSPHATE FURNACE FEED
Filed Oct. 6, 1949
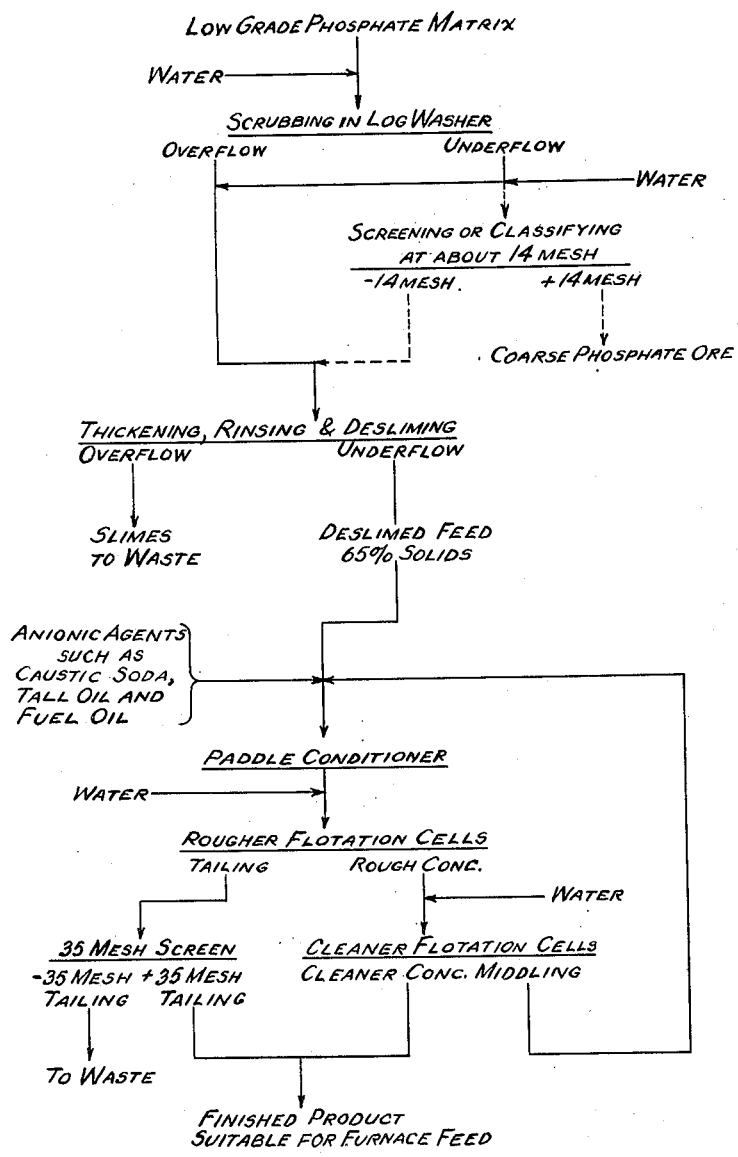
INVENTOR.
WESLEY M. HOUSTON
BY
ATTORNEYS Patented Feb. 9, 1954

2,668,617

UNITED STATES PATENT OFFICE 2,668,617

PRODUCTION OF PHOSPHATE FURNACE FEED

Wesley M. Houston, Lakeland, Fla., assignor to Attapulgus Minerals & Chemicals Corporation, a corporation of Maryland Application October 6, 1949, Serial No. 119,904

2 Claims. (Cl. 209—2)

This invention relates to the production of a phosphate furnace feed, particularly (but not exclusively) from a phosphate matrix of a kind which is found in the State of Tennessee.

A satisfactory phosphate furnace feed should contain about 50% to 60% bone phosphate of lime (BPL) and the remainder should be largely silica. In a furnace operation for the purpose of producing elemental phosphorous, the silica serves to produce a slag and to control the melting point of the charge. Therefore, the silica is a necessary constituent of a phosphate furnace feed and must be present in the proper proportion. To this end it is necessary for furnace operators to maintain stocks of phosphate materials of various bone phosphate of lime and silica contents, and to blend these together in the proper proportions for the furnace feed. Prior to my invention there has not been very much control over the BPL and silica contents of the materials available for stock piling. These materials have consisted principally of (1) Tennessee phosphate matrix of various grades and proportions of BPL and silica as mined; (2) the coarser rock obtained from the matrix by scrubbing and screening or classifying at about 14 mesh or coarser; (3) the —14 mesh phosphatic sands which have been washed free of the —325 mesh (approx.) slimes; and (4) high grade pebble rock or concentrates recovered from the finer phosphatic sands of Florida, which have to be shipped to Tennessee furnaces. Due to the difficulty of controlling the grade of the products obtained from the lower grade Tennessee matrices, and the high cost of high grade blending materials which must be shipped in, there are many lower grade phosphate matrix deposits in Tennessee which it is not economical to mine.

The general object of my invention is the economical production from a phosphate matrix, which is too low in bone phosphate of lime content for furnace feed, of a material which is satisfactory for this purpose. A further object is the utilization of phosphate matrix deposits which may not have been economically usable in the past. A more particular object of my invention is to afford a practical method of producing a furnace feed product from the —14 +325 mesh fraction of those phosphate matrices which are normally too low in BPL grade for this purpose. Other objects and advantages of my invention will appear in the following description.

In practicing the invention, the low grade phosphate matrix is subjected to the usual wet scrubbing or disintegrating process utilizing, for example, log washers, in order to free the clay and slimes from the sands and coarser particles. After this operation the finished product is made by the treatments about to be mentioned. As indicated in the drawing by dotted lines, the coarser phosphate ore of about +14 mesh size may be screened or classified out of the disintegrated matrix and preserved; and the —14 mesh portion may be added to the over-flow from the log washers just mentioned; but this sizing operation can be omitted. The clay or slime, which is approximately —325 mesh in particle size is substantially removed from the said feed by hydraulic thickening and rinsing devices, and is sent to waste. The deslimed ore feed is then conditioned in a thick aqueous pulp (say 65% solids) with anionic collector agents having an affinity for the phosphate, and is subjected to any well known concentrating operation, such as froth-flotation treatment in flotation cells the amount of such reagents being sufficient to produce a phosphate concentrate containing a considerable amount of fine silica gangue, and a tailing composed essentially of the silica particles and phosphate particles which are too coarse to be concentrated by the conditioning effect of the anionic agents. This tailing is then subjected to a screening or classifying treatment resulting in the removal from it of the larger phosphate particles along with a less proportion of silica particles (both say +35 mesh) and this coarser product is added to the above mentioned phosphate concentrate, thereby making a final product which is suitable for use as a phosphate furnace feed material. The finer residue (say —35 mesh) of the last mentioned operation, composed principally of fine silica particles, is sent to waste. As shown in the drawing, the concentrating operation may be carried out in rougher flotation cells and cleaner flotation cells, thereby producing a middling which may be returned to the feed which is conditioned with the anionic agents.

It will be apparent that the method just described is simple and avoids the use of expensive apparatus for screening or classification of the ore prior to the concentrating operation; and that it requires screening or equivalent treatment of only a fraction of the original ore. Consequently, screening of the tailing can be carried out at a smaller mesh size than would be practicable with the original ore. These are very worthwhile advantages, both from the standpoint of reduced capital investment requirements and also reduced operating and maintenance expenses, and are very important in the production of such a low-priced and low-grade phosphate product as that used for a furnace feed.

The phosphate concentrating operation may be carried out by the use of well-known apparatus such as flotation cells, shaking tables, belts, spirals, etc. The screening or equivalent treatment of the tailings resulting from the concentrating operation may be carried out preferably by the use of screens such as vibrating screens, or by any other suitable classifying apparatus. The anionic agents employed may be those customarily used with phosphate ores, such as oleic acid, fatty acids or tall oil, an alkali such as caustic soda, and an unsaponifiable oil such as fuel oil.

The invention will be understood from the following description of examples of the successful practicing of the methods, taken in connection with the accompanying drawing which is a conventional flow-sheet illustrating the various steps of the method.

The phosphate ore used in the following examples was a low-grade Tennessee phosphate matrix in which the bone phosphate of lime content was only 40.5%. This matrix was first disintegrated by wet scrubbing and then the +14 mesh fraction, amounting to 7.7% weight and analyzing 47.47% BPL, was removed by wet screening. The remaining ore was substantially deslimed to produce approximately a −14+325 mesh material containing 46.5% BPL, the −325 mesh slimes being sent to waste. The deslimed feed thus obtained was conditioned for two minutes in a thick aqueous pulp containing about 65% solids, with tall oil, caustic soda and fuel oil, in the amounts per ton of solids in the feed hereinafter mentioned. The thus conditioned pulp of the deslimed ore was then diluted with water and subjected to froth-flotation treatment. This produced in a froth a rougher phosphate concentrate, and a tailing, both of which were reserved for further treatment. This rougher phosphate concentrate was subjected to a second froth-flotation treatment, thereby producing a cleaner phosphate concentrate which is a part of the finished product suitable for furnace feed, and a middling which was returned to the feed to the first rougher concentrating operation. The tailing from the first flotation treatment was wet-screened on 35 mesh standard Tyler screens and the +35 mesh portion was added to the cleaner phosphate concentrate resulting from the second froth flotation treatment; and the −35 mesh portion was sent to waste. The method thus produced, as the final product having a grade suitable for a furnace feed, the mixture of the +35 mesh tailing from the screening of the tailing from the rougher flotation cells with the cleaner concentrate from the cleaner flotation cells.

Example 1

In this example, the reagents employed were caustic soda 2.0 lbs., fuel oil 10.0 lbs. and tall oil 2.0 lbs., each per ton of solids in the deslimed feed. The metallurgical results were as follows:

| Product | Percent Wt. | Percent BPL | Percent Insol. | Percent BPL Rec. |
|---|---|---|---|---|
| Deslimed Feed | 100.0 | 46.5 | | 100.0 |
| Flot. Concentrate | 81.3 | 53.0 | 33.4 | 92.6 |
| Middling | 3.9 | 16.9 | | 1.4 |
| +35 mesh Tailing | 3.7 | 45.1 | | 3.6 |
| −35 mesh Tailing | 9.2 | 7.6 | | 1.5 |
| −325 Flot. Slimes | 1.9 | 20.8 | | 0.9 |
| Final Product (Concentrate and +35 mesh tailing) | 85.0 | 52.7 | | 96.2 |

Example 2

In this example, the reagents employed were caustic soda 1.00 lb., fuel oil 7.50 lbs., and tall oil 0.75 lb. It will be noted that the amounts of reagents just mentioned are much less than the amounts of the reagents employed in Example 1. The metallurgical results were as follows:

| Product | Percent Wt. | Percent BPL | Percent Insol. | Percent BPL Rec. |
|---|---|---|---|---|
| Deslimed Feed | 100.0 | 46.7 | | 100.0 |
| Flot. Concentrate | 62.1 | 58.0 | 26.7 | 77.2 |
| Middling | 8.7 | 37.3 | | 7.0 |
| +35 mesh Tailing | 5.6 | 50.5 | 35.0 | 6.1 |
| −35 mesh Tailing | 20.8 | 16.5 | | 7.3 |
| −325 Flotation Slimes | 2.8 | 39.9 | | 2.4 |
| Final Product (Concentrate and +35 mesh tailing) | 67.7 | 57.4 | 27.4 | 83.3 |

Examples 1 and 2 show the results of practicing the method with high and low reagent quantities. In Example 1 the B. P. L. grade was lowered, after combining the +35 screen tailings with the flotation concentrate, only by 0.3%, while the B. P. L. recovery was increased 3.6% and the weight of the feed requiring screening on 35 mesh was reduced to 12.9% of the original. In Example 2 the B. P. L. grade of the final concentrate, after combining the +35 screen tailings with the flotation concentrate, was lowered by only 0.6%, while the B. P. L. recovery was increased from 77.2% to 83.3% and the weight of the feed requiring screening on 35 mesh was reduced to 26.4% of the original. In Example 2, the final concentrate grade was 57.4% B. P. L.; compared with 52.7% B. P. L. in Example 1 but this small increase in grade in Example 2, from the use of smaller quantities of reagents than in Example 1, was at the expense of a very considerable loss in recovery, that is, from 96.2% to 83.3%. As the grade of product in Example 1 is quite satisfactory for furnace feed, the method of Example 1 is preferred, although it requires the use of more reagents than does Example 2. These two examples show how the control of the flotation operation results in control of the grade of product. It will be apparent, from both examples, that combining the +35 mesh fraction of the flotation tailing with the flotation concentrate increased the recovery of B. P. L. considerably, and produced only a slight detrimental effect on the grade (per cent B. P. L.) of the final concentrate; and that the amount of material fed to the difficult 35 mesh screening operation was only about ¼ to ⅛ of the original feed.

What is claimed is:

1. The method of producing a phosphate furnace feed which comprises wet scrubbing, disintegrating and desliming a phosphate ore matrix and obtaining therefrom a feed in which the phosphate and silica particles are about −14 mesh, conditioning said deslimd feed in an aqueous pulp with anionic agents having an affinity for the phosphate, subjecting said conditioned pulp to a wet separating treatment, the amount of said reagents being sufficient to produce a phosphate concentrate principally composed of most of the smaller phosphate particles and a large part of the finer silica particles, and a tailing principally composed of the larger phosphate particles and the remaining silica particles, and subjecting said tailing to a classification treatment resulting in the collection from said tailing of the larger phosphate and larger silica particles which are added to said concentrate, thereby producing directly from the phosphate ore matrix a final product which is a suitable phosphate furnace feed.

2. The method of producing a phosphate furnace feed which comprises wet scrubbing, disintegrating and desliming a phosphate ore matrix and obtaining therefrom a feed in which the phosphate and silica particles are about −14 mesh, conditioning said deslimed feed in an aqueous pulp with anionic agents having an affinity for the phosphate, subjecting said conditioned pulp to a froth-flotation treatment, the amount of said reagents being sufficient to produce as the floated material a phosphate concentrate principally composed of most of the smaller phosphate particles and a large part of the finer silica particles, and a tailing principally composed of the larger phosphate particles and the remaining silica particles, and subjecting said tailing to a screening treatment resulting in the collection from said tailing of the phosphate and silica particles larger than about 35 mesh which are added to said concentrate, thereby producing directly from the phosphate ore matrix a final product which is a suitable phosphate furnace feed.

WESLEY M. HOUSTON.

References Cited in the file of this patent

UNITED STATES PATENTS

| Number | Name | Date |
|---|---|---|
| 2,156,245 | Mead et al. | Apr. 25, 1939 |

FOREIGN PATENTS

| Number | Country | Date |
|---|---|---|
| 482,931 | Great Britain | Apr. 7, 1938 |

OTHER REFERENCES

A. I. M. M. E. Technical Publication 606, © 1935.

Engineering and Mining Journal, January 1941, pages 49–51.

Pit and Quarry, February 1941, pages 36–40.

"Phosphorous Furnace Reactions" by C. P. Zergiebel et al., paper presented at the 81st General Meeting of the Electrochemical Society, April 15–18, 1942, preprint 81—30.

Rock Products, August 1949, pages 105–109.